United States Patent
Bai et al.

(10) Patent No.: US 11,162,010 B2
(45) Date of Patent: Nov. 2, 2021

(54) NANOMETER PLUGGING WATER-BASED DRILLING FLUID AND PREPARATION METHOD AND USE THEREOF

(71) Applicant: Southwest Petroleum University, Chengdu (CN)

(72) Inventors: Yang Bai, Chengdu (CN); Pingya Luo, Chengdu (CN); Guojun Li, Chengdu (CN); Cheng Li, Chengdu (CN); Hao Zhang, Chengdu (CN); Yan Cheng, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 0 days.

(21) Appl. No.: 16/748,144

(22) Filed: Jan. 21, 2020

(65) Prior Publication Data

US 2021/0163807 A1 Jun. 3, 2021

(30) Foreign Application Priority Data

Dec. 3, 2019 (CN) .......................... 201911222408.2

(51) Int. Cl.
*C09K 8/24* (2006.01)
*C09K 8/035* (2006.01)

(52) U.S. Cl.
CPC ............... *C09K 8/24* (2013.01); *C09K 8/035* (2013.01); *C09K 2208/10* (2013.01); *C09K 2208/12* (2013.01); *C09K 2208/34* (2013.01)

(58) Field of Classification Search
None
See application file for complete search history.

(56) References Cited

U.S. PATENT DOCUMENTS

| | | | | | |
|---|---|---|---|---|---|
| 4,123,367 | A | * | 10/1978 | Dodd | E21B 21/00 507/140 |
| 2011/0136701 | A1 | * | 6/2011 | Prebensen | C09K 8/03 507/111 |
| 2014/0323361 | A1 | * | 10/2014 | Livanec | C09K 8/035 507/120 |
| 2016/0177162 | A1 | * | 6/2016 | Nguyen | C09K 8/602 166/300 |
| 2016/0362594 | A1 | * | 12/2016 | Rojas | C09K 8/12 |
| 2018/0346797 | A1 | * | 12/2018 | Kalgaonkar | C09K 8/5755 |
| 2018/0362834 | A1 | * | 12/2018 | Haghighi | C09K 8/88 |
| 2020/0190384 | A1 | * | 6/2020 | Patel | C09K 8/584 |

FOREIGN PATENT DOCUMENTS

CN 10308857 A * 11/2015

OTHER PUBLICATIONS

ASPHASOL Sulfonated-asphalt shale inhibitor; MiSWACO Commercial Brochure. 1 page. (Year: 2019).*

* cited by examiner

*Primary Examiner* — Charles R Nold
(74) *Attorney, Agent, or Firm* — Volpe Koenig

(57) ABSTRACT

A nanometer plugging water-based drilling fluid and preparation method and use thereof are within this disclosure. The nanometer plugging water-based drilling fluid comprise a nanometer plugging agent. The nanometer plugging agent may be surface modified $SiO_2$ powder with the surfactant. The surfactant may be sodium dodecyl benzene sulfonate and/or sodium dodecyl sulfate. The nanometer plugging water-based drilling fluid may perform effective anti-collapse of stratum and maintain the stability of stratum.

2 Claims, No Drawings

NANOMETER PLUGGING WATER-BASED DRILLING FLUID AND PREPARATION METHOD AND USE THEREOF

PRIORITY CLAIM & CROSS REFERENCE

The application claims priority to Chinese Application No. 201911222408.2, filed on Dec. 3, 2019, entitled "nanometer plugging water-based drilling fluid and preparation method and use thereof", which is herein specifically and entirely incorporated by reference.

FIELD

The present disclosure relates to the technical field of drilling fluid, and particularly relates to a nanometer plugging water-based drilling fluid and preparation method and use thereof.

BACKGROUND

Clay-shale generally consists of crystalline clay minerals, amorphous clay minerals and non-clay minerals. An analysis of scanning electron microscope images of hard and brittle clay-shale shows that the clay minerals in the clay-shale have desirable directionality, stratification and microcrack development.

The shale belongs to the hard and brittle stratum, the micropore development is highly sensitive to water, thus the borehole wall instability accidents such as borehole collapse and hole shrinkage are prone to happen during a drilling process of the deep layer large displacement horizontal wells and the horizontal wells. Although the oil-based drilling fluid is conducive to maintaining stability of the borehole and protecting the reservoir to the greatest extent and it is widely applied in the process of drilling shale gas horizontal wells, but the drilling fluid causes serious pollution by the drill cuttings, which requires treatment with serious difficulty and high cost, and the technologies such as construction tools and plugging materials matched with the drilling fluid are immature, thus the large-scale use of the drilling fluid is seriously restrained. The existing water-based drilling fluid has insufficient plugging capacity in regard to the heterogeneous micro-nanometer apertures of shale stratum, it is difficult to meet the construction requirements on the safe and efficient drilling process.

The existing plugging material has large particle size and its shape is not matched with the crack, the plugging material is difficult to enter micro-nanometer pores and cracks of a shale stratum, and the plugging effect is poor. The nanometer material can enter the nano-scale pores and cracks by virtue of the characteristics of extremely small particle size, excellent dispersity and stability, and can perform effective plugging by cooperating with the micron-scale plugging material and the synergistic effect thereof, so that the pressure bearing capacity of the stratum is increased, and the stability of the borehole is maintained.

The shale gas resource has wide prospect, huge development potential and economic and social values, the large-scale development of the shale gas is conducive to safe-guarding the national energy safety of China.

Therefore, the preparation of a novel nanometer plugging water-based drilling fluid has important practical significance.

SUMMARY

For the sake of solving the problems in the prior art that the existing plugging material has larger particle size and is easy to agglomerate, the present disclosure provides a nanometer plugging water-based drilling fluid, a preparation method and use thereof. When the drilling fluid is used to one or more of a horizontal large displacement well of a shale stratum, a shale fragile stratum and a deep layer highly-deviated well, the stratum can be effectively prevented from collapsing, thus the stability of the stratum can be maintained.

In order to fulfill the above purposes, a first aspect of the present disclosure provides a nanometer plugging water-based drilling fluid, wherein the drilling fluid comprises water, bentonite, an anti-collapse agent, a nanometer plugging agent and a weighting agent; wherein the anti-collapse agent is sulfonated asphalt; the nanometer plugging agent is surface modified $SiO_2$ powder with an average particle size of 10-80 nm; the weighting agent is limestone; based on 100 parts by weight of water, the bentonite is 1-5 parts by weight, the anti-collapse agent is 2-16 parts by weight, the nanometer plugging agent is 0.1-6 parts by weight and the weighting agent is 20-60 parts by weight.

In a second aspect, the present disclosure provides a method for preparing the aforementioned drilling fluid, including:

(S1) subjecting the bentonite to a prehydration treatment to obtain a base slurry;

(S2) mixing the base slurry with the anti-collapse agent, the nanometer plugging agent and the weighting agent sequentially.

In a third aspect, the present disclosure provides a method for preparing the aforementioned drilling fluid being used in one or more of a horizontal large displacement well of a shale stratum, a shale fragile stratum and a deep layer highly-deviated well.

Due to the implementation of the technical solution, the drilling fluid disclosed by the present disclosure has the following advantages:

(1) The nanometer plugging agent has desirable water stability and uniform particle size distribution; the insoluble large particles in the anti-collapse agent sulfonated asphalt (flexible material) and the small particles of the nanometer plugging agent nanometer $SiO_2$ (rigid material) are mutually extruded, such that the plugging capability of the drilling fluid is enhanced.

(2) The drilling fluid system has excellent rheological property, and the borehole purification capacity is improved;

(3) The drilling fluid system uses sulfonated asphalt to reduce the interference of fluorescence on the well logging operation.

DETAILED DESCRIPTION

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

In a first aspect, the present disclosure provides a nanometer plugging water-based drilling fluid, which comprises water, bentonite, an anti-collapse agent, a nanometer plugging agent and a weighting agent; wherein the anti-collapse agent is sulfonated asphalt; the nanometer plugging agent is surface modified $SiO_2$ powder with an average particle size of 10-80 nm; the weighting agent is limestone; wherein based on 100 parts by weight of water, the bentonite is 1-5 parts by weight, the anti-collapse agent is 2-16 parts by weight, the nanometer plugging agent is 0.1-6 parts by weight and the weighting agent is 20-60 parts by weight.

According to the present disclosure, the basic raw material of the sulfonated asphalt is petroleum asphalt, the appearance of the sulfonated asphalt is brown crunchy flake or flowing powder, one part of the sulfonated asphalt is soluble in water to form a hydrated membrane, and the other water-insoluble part may be used for filling, wherein the particles of the water-insoluble part have an average particle diameter of 0.2-10 μm and a density of 0.98 g/cm$^3$, the sulfonated asphalt has strong hydration effect because it contains sulfonic acid groups, and can prevent the hydration dispersion of shale particles and play a role of preventing collapse when it is adsorbed on the shale interface. Meanwhile, the water-insoluble part may fill pore throats and cracks to play a plugging role, and cover the shale interface to improve the quality of mud cakes.

In the present disclosure, when the anti-collapse agent sulfonated asphalt is used, on one hand, the anti-collapse agent may plug the pore throats, cracks or fractures of the clay-shale by utilizing the blocking and film-formation effects of particles so as to reduce the filtrate loss, but the particles are "micelle" particles generated under the action of temperature. When the slurry temperature is higher than the "cloud point" of the sulfonated asphalt in the solution phase, the solution phase is separated to form water microemulsion to plug micropores of a borehole wall and prevent the slurry filtrate from permeating into a stratum; on the other hand, the phase separation action causes the ether macromolecules to form micelles, which are adhered to the surface of the shale through hydrogen bonds to form a protective layer, so that the filtrate is prevented from intruding into the rock.

The present disclosure recites that the weighting agent is limestone which has a density of 4.2 g/cm$^3$, an average particle size of 2-10 μm, and contains 90% of the main component $CaCO_3$.

According to the present disclosure, based on 100 parts by weight of water, the bentonite is 2-4 parts by weight, the anti-collapse agent is 4-12 parts by weight, the nanometer plugging agent is 0.3-4 parts by weight and the weighting agent is 20-45 parts by weight.

More preferably, based on 100 parts by weight of water, the bentonite is 2-3 parts by weight, the anti-collapse agent is 4-8 parts by weight, the nanometer plugging agent is 0.8-2 parts by weight and the weighting agent is 30-40 parts by weight.

In the present disclosure, due to strictly controlling the components (water, bentonite, an anti-collapse agent, a nanometer plugging agent and a weighting agent) and the content thereof, the components interact with each other such that the prepared drilling fluid can exert the optimal effect in the drilling process, the prepared drilling fluid may effectively plug the micro-nanometer cracks, prevent the collapsing, falling block and instability of borehole wall, and maintain stability of the borehole wall with desirable application effect.

According to the present disclosure, the drilling fluid further comprises a shale inhibitor which is an organic acid ester LYG-2; in the present disclosure, the shale inhibitor is 0.5-2 parts by weight, preferably 0.8-1.8 parts by weight, and more preferably 1-1.5 parts by weight, based on 100 parts by weight of water.

In the present disclosure, the organic acid ester LYG-2 is a high-grade organic acid ester and a novel clay stabilizer. The inventors of the present disclosure have surprisingly discovered that the main mechanism that the organic acid ester LYG-2 can stabilize the clay, the main mechanism resides in that the particles with wider size distribution are combined to the end part of a clay crystal layer through absorption, diffusion and other ways to block cracks between clay layers and inhibit hydration of the clay, thereby stabilizing the clay; the inhibitor and the clay carry out chemical reaction to generate an amorphous, highly cementitious mass under certain conditions, such as high temperature and prolonged contact, so that the mineral particles (e.g., clay) agglomerate into a robust integrity. The high-efficiency shale inhibitor organic acid ester LYG-2 can react with multivalent ions of the stratum to form a molecular film on the borehole wall surface. The shale inhibitor can be compatible with the ordinary polymer processing agents. The drilling fluid has excellent high-temperature resistance rheological property and drilling cutting pollution resistance, the drilling fluid even exhibits desirable rheological property when the density is higher than 2.0 g/cm$^3$.

According to the present disclosure, when the micro-nanometer scale pores and cracks are drilled, the shale inhibitor organic acid ester LYG-2 may be used for reacting with multivalent ions in the stratum to form a molecular membrane on the borehole wall surface, thereby efficiently inhibiting the hydration and expansion of clay, improving the plugging capability of drilling fluid, and reducing the possibility of collapse and block falling in the drilling process.

According to the present disclosure, the drilling fluid further comprises a filtrate reducer, which is a polyanionic cellulose PAC-LV; in the present disclosure, the filtrate reducer is used in an amount of 2 to 12 parts by weight, preferably 3 to 10 parts by weight, and more preferably 3 to 6 parts by weight, based on 100 parts by weight of water.

In the present disclosure, the polyanionic cellulose PAC-LV is an organic high molecular polymer with high water solubility and is in a state of white powder; the filter cake generated by using the filtrate reducer is thinner and more compact, thus the accidents such as drill sticking are not likely to happen. In the present disclosure, the substitution degree of the polyanionic cellulose PAC-LV is 0.8-1.4, its aqueous solution has stable performance at a temperature below 80° C.; it still shows certain viscosity when the temperature is close to 150° C.; it has stable performance when the pH is within a range of 3-11, the polyanionic cellulose can be applied in a variety of harsh and extreme environments. In addition, it shall be noted that the cellulose ether is a product in which hydroxyl groups on the molecular chain of cellulose are substituted with ether groups, and the number of hydroxyl groups substituted with a reactive agent per anhydroglucose unit is referred to as the substitution degree.

According to the present disclosure, the drilling fluid further comprises a lubricant, wherein the lubricant is graphite; in the present disclosure, the lubricant is 0.2-4 parts by weight, preferably 1.5-3.5 parts by weight, and more preferably 2-3 parts by weight, based on 100 parts by weight of water.

In the present disclosure, the graphite is a solid lubricant prepared by the synthetic reaction of a natural crystalline carbon compound, unsaturated fatty acid and a cationic surfactant. In the present disclosure, the appearance of the lubricant graphite is black powder, the pH value is 6-8, and the reduction rate of the lubrication coefficient is >50%.

According to the present disclosure, the method of preparing the nanometer plugging agent comprises the following steps:

(1) contacting an aqueous solution containing a surfactant with $SiO_2$ to obtain a blended solution;

(2) subjecting the blended solution to ultrasonic dispersion treatment to obtain a product A;

(3) performing ultrasonic crushing treatment on the product A, and then carrying out drying procedure to obtain surface modified $SiO_2$ powder.

According to the present disclosure, the surfactant in the step (1) is linear alkylbenzene sulfonate (LAS) and/or sodium dodecyl sulfate (SDS), preferably sodium dodecyl sulfate (SDS).

Wherein the concentration of the surfactant is 1-5 mg/mL, preferably 2-3 mg/mL.

Wherein the concentration of $SiO_2$ is within a range of 0.1-0.6 mg/mL, preferably 0.2-0.5 mg/mL.

Preferably, the conditions of the contacting include: the temperature is 10-40° C., and the time is 20-40 min.

According to the present disclosure, the conditions of the ultrasonic dispersion in the step (2) comprise: the temperature is 10-40° C., the preferred temperature is 15-35° C., the time is 1-10 min, the preferred time is 4-6 min, the ultrasonic frequency is 15-30 kHz, and the ultrasonic power is 100-220 W; in addition, the ultrasonic dispersion is performed in an ultrasonic cleaner, which is purchased from Shanghai ultrasonic analyzer, Inc. and has a model number DS-8510 DT.

According to the present disclosure, the conditions of the ultrasonic pulverization in the step (3) comprise: the ultrasonic pulverization is carried out for 10-30 min, preferably 15-25 min, and more preferably 22-24 min under the ice bath condition, preferably under the temperature condition of −15° C. to 0° C., under the conditions that the ultrasonic frequency is 40-65 KHz, and the ultrasonic power is 200-300 W, preferably 230-300 W. In addition, the ultrasonic pulverization is carried out in an ultrasonic cell pulverization instrument, wherein the ultrasonic cell pulverization instrument is purchased from Shanghai Huxi Industry Co., Ltd. with a model number JY 96-2N. In addition, it should be noted in the present disclosure that the ice bath condition means that ice is continuously added into the cooling container to enable the experiment temperature to be within a range of −15° C. to 0° C., and the reaction temperature is reduced by the ice to fulfill the purpose of lowering the temperature.

According to the present disclosure, the conditions of the drying process in the step (3) include: the drying temperature is between 120-180° C., preferably between 120-150° C., and more preferably between 130-145° C.; the time is within a range of 4-10 h, preferably 6-9 h.

According to the present disclosure, the average particle size of the nanometer plugging agent is 10-80 nm, preferably 40-70 nm, more preferably 45-65 nm, and further preferably 45.3-52.3 nm; the nanometer plugging agent is amorphous white powder, which is non-toxic, tasteless and pollution-free, has a spherical microstructure, exhibits a flocculent and reticular quasi-particle structure, can fill nano-scale pores, effectively plug the drilling fluid filtrate from entering a stratum, and prevent collapsing of a borehole wall.

In the present disclosure, the nanometer plugging agent can prevent the agglomeration of nanometer particles; in addition, the nanometer plugging agent, the anti-collapse agent and the limestone are reasonably compounded and have particle size grading, and the particles are mutually extruded and tightly combined to generate a "force chain network" on a micro-scale contact interface, thereby improving the plugging capability of the drilling fluid composition and preventing the collapse of a borehole wall.

In a second aspect, the present disclosure provides a method for preparing the aforementioned drilling fluid, including:

(S1) subjecting the bentonite to a prehydration treatment to obtain a base slurry;

(S2) mixing the base slurry with the anti-collapse agent, the nanometer plugging agent and the weighting agent sequentially.

According to the present disclosure, the bentonite in the step (S1) is calcium bentonite. The bentonite prehydration method comprises the following steps: adding 2-3 parts by weight of bentonite into 100 parts by weight of water, further adding 0.05-0.5 part by weight, preferably 0.15-0.25 part by weight of $Na_2CO_3$ at the temperature of 45-55° C., stirring for 30 min at the stirring speed of 450-550 r/min, standing still for 24 h, converting calcium bentonite into sodium bentonite through ion exchange and precipitation, and effectively improving the pulping rate, namely performing prehydration treatment by using sodium carbonate.

According to the present disclosure, the stirring conditions in the step (S2) include: stirring at the stirring speed of 750-850 r/min, wherein the anti-collapse agent, the nanometer plugging agent and the weighting agent are sequentially added and mixed with a mixing time of 10-20 min.

In a third aspect, the present disclosure provides a method for preparing the aforementioned drilling fluid being used in one or more of a horizontal large displacement well of a shale stratum, a shale fragile stratum and a deep layer highly-deviated well.

In the present disclosure, the horizontal large displacement well of a shale stratum is a directional well with a ratio of the horizontal displacement to the vertical depth being equal to or greater than 2, preferably, the measurement depth of the directional well is greater than 3,000 m, or the horizontal displacement of the directional well is greater than 3,000 m.

In the present disclosure, the shale fragile stratum refers to a hard fragile shale stratum with obvious stratum stratification and micro-crack development and strong heterogeneity, wherein the drilling process is prone to cause the underground complex conditions and accidents.

In the present disclosure, the deep layer highly-deviated well refers to a directional well having a maximum well inclination angle within a range of 60° to 86°.

The present disclosure will be described in detail below with reference to examples.

In the following Examples and Comparative Examples:

The electronic balance with the precision of 0.001 g is purchased from Shanghai balance instrument factory;

The bentonite is purchased from Xinjiang Nonmetallic Minerals Xiazijie Bentonite Co., Ltd. with a product name Xinjiang Xiazijie Bentonite;

The $Na_2CO_3$ is purchased from Chengdu Kelong Chemical Reagent Factory with a product name Sodium Carbonate;

The organic acid ester LYG-2 is commercially available from Shandong Juxin chemical Co., Ltd.;

The polyanionic cellulose PAC-LV is purchased from Shijiazhuang Yingte Chemical Co., Ltd.;

The sulfonated asphalt is purchased from Renqiu Jinjia Chemical Products Co., Ltd.;

The sodium dodecyl sulfate (SDS) is commercially available from Wuxi Asia Pacific United Chemical Co., Ltd.;

The weighting agent limestone is purchased from the Lingshou County Yixin Mineral Product Processing Factory in Hebei Province.

Preparation Example 1

The preparation example aims to illustrate a method of preparing the nanometer plugging agent of the present disclosure.

2 mg of nanometer $SiO_2$ is weighted, 20 ml of water is added, 0.06 g of surfactant linear alkylbenzene sulfonate (LAS) is also added for blending, the ultrasonic dispersion is initially performed with an ultrasonic cleaning instrument at the normal temperature of 25° C. for 6 min, and the mixture is ultrasonically pulverized with an ultrasonic cell pulverizer under the ice bath condition for 20 min; the ultrasonic power of the ultrasonic cleaning instrument is 150 W; the ultrasonic frequency of the ultrasonic cell pulverizer is 45 KHz, and the ultrasonic power is 230 W. And finally, the nanometer $SiO_2$ dispersion liquid is dried at a temperature of 130° C. for 6 hours to obtain nanometer $SiO_2$ particles with dispersed surfaces.

The nanometer plugging agent nanometer $SiO_2$ prepared according to the above steps is white powder, it has an average particle size of 45.3 nm and a spherical microstructure, it is flocculent and is insoluble in water, and can effectively plug the nanometer pores of the shale stratum.

Preparation Example 2

The preparation example aims to illustrate a method of preparing the nanometer plugging agent of the present disclosure.

3 mg of nanometer $SiO_2$ is weighted, 20 ml of water is added, 0.08 g of surfactant linear alkylbenzene sulfonate (LAS) is also added for blending, the ultrasonic dispersion is initially performed with an ultrasonic cleaning instrument at the normal temperature of 25° C. for 8 min, and the mixture is ultrasonically pulverized with an ultrasonic cell pulverizer under the ice bath condition for 25 min; the ultrasonic power of the ultrasonic cleaning instrument is 180 W; the ultrasonic frequency of the ultrasonic cell pulverizer is 50 KHz, and the ultrasonic power is 240 W. And finally, the nanometer $SiO_2$ dispersion liquid is dried at a temperature of 140° C. for 7 hours to obtain nanometer $SiO_2$ particles with dispersed surfaces.

The nanometer plugging agent nanometer $SiO_2$ prepared according to the above steps is white powder, it has an average particle size of 49.5 nm and a spherical microstructure, it is flocculent and is insoluble in water, and can effectively plug the nanometer pores of the shale stratum.

Preparation Example 3

The preparation example aims to illustrate a method of preparing the nanometer plugging agent of the present disclosure.

4 mg of nanometer $SiO_2$ is weighted, 20 ml of water is added, 0.1 g of surfactant linear alkylbenzene sulfonate (LAS) is also added for blending, the ultrasonic dispersion is initially performed with an ultrasonic cleaning instrument at the normal temperature of 25° C. for 10 min, and the mixture is ultrasonically pulverized with an ultrasonic cell pulverizer under the ice bath condition for 30 min; the ultrasonic power of the ultrasonic cleaning instrument is 220 W; the ultrasonic frequency of the ultrasonic cell pulverizer is 60 KHz, and the ultrasonic power is 260 W. And finally, the nanometer $SiO_2$ dispersion liquid is dried at a temperature of 145° C. for 8 hours to obtain nanometer $SiO_2$ particles with dispersed surfaces.

The nanometer plugging agent nanometer $SiO_2$ prepared according to the above steps is white powder, it has an average particle size of 52.3 nm and a spherical microstructure, it is flocculent and is insoluble in water, and can effectively plug the nanometer pores of the shale stratum.

Example 1

The example illustrates a nanometer plugging water-based drilling fluid prepared by using the method of the present disclosure.

(1) 100 parts by weight of water is weighted, the water is heated to 70° C., 2 parts by weight of bentonite is added under the condition of a stirring rate 600 r/min of a low-speed electric stirrer, and continuously stirred for 20 min, then 0.05 part by weight of $Na_2CO_3$ is added and further stirred for 30 min, and subjected to standing still for 24 hours at room temperature for carrying out the prehydration treatment;

(2) On the basis of prehydrated bentonite slurry, 0.5 part by weight of the inhibitor modified organic acid ester LYG-2 is added under the condition of a stirring rate of 600 r/min in a low-speed electric mixer and stirred for 20 min, 2 parts by weight of the filtrate reducer polyanionic cellulose PAC-LV is added and stirred for 15 min, 2 parts by weight of the anti-collapse agent sulfonated asphalt is added and stirred for 15 min, the average particle size of the particles of the water-insoluble part in the sulfonated asphalt is 8 μm, then 0.1 part by weight of the nanometer plugging agent prepared in the Preparation Example 1 is added and stirred for 15 min, 0.2 part by weight of the lubricant graphite is further added and stirred for 15 min, and 20 parts by weight of the weighting agent limestone with an average particle size of 2 μm is added and stirred in a low-speed electric mixer with a stirring rate of 700 r/min for 20 min, thereby prepare the drilling fluid.

The testing results of the linear expansion rate and the rolling recovery rate of the drilling fluid are shown in Table 1, and the testing results of the shale micro-crack plugging performance are shown in Table 2.

Example 2

The example illustrates a nanometer plugging water-based drilling fluid prepared by using the method of the present disclosure.

(1) 100 parts by weight of water is weighted, the water is heated to 70° C., 2 parts by weight of bentonite is added under the condition of a stirring rate 600 r/min of a low-speed electric stirrer, and continuously stirred for 20 min, then 0.5 part by weight of $Na_2CO_3$ is added and further stirred for 30 min, and subjected to standing still for 24 hours at room temperature for carrying out the prehydration treatment;

(2) On the basis of prehydrated bentonite slurry, 0.5 part by weight of the inhibitor modified organic acid ester LYG-2 is added under the condition of a stirring rate of 600 r/min in a low-speed electric mixer and stirred for 20 min, 4 parts by weight of the filtrate reducer polyanionic cellulose PAC-LV is added and stirred for 15 min, 5 parts by weight of the anti-collapse agent sulfonated asphalt is added and stirred for 15 min, the average particle size of the particles of the water-insoluble part in the sulfonated asphalt is 1 μm, then 2 part by weight of the nanometer plugging agent prepared in the Preparation Example 1 is added and stirred for 15 min, 1.4 part by weight of the lubricant graphite is further added and stirred for 15 min, and 30 parts by weight of the weighting agent limestone with an average particle size of 10 µm is added and stirred in a low-speed electric mixer with a stirring rate of 700 r/min for 20 min, thereby prepare the drilling fluid.

The testing results of the linear expansion rate and the rolling recovery rate of the drilling fluid are shown in Table 1, and the testing results of the shale micro-crack plugging performance are shown in Table 2.

Example 3

The example illustrates a nanometer plugging water-based drilling fluid prepared by using the method of the present disclosure.

(1) 100 parts by weight of water is weighted, the water is heated to 70° C., 2 parts by weight of bentonite is added under the condition of a stirring rate 600 r/min of a low-speed electric stirrer, and continuously stirred for 20 min, then 1.05 part by weight of $Na_2CO_3$ is added and further stirred for 30 min, and subjected to standing still for 24 hours at room temperature for carrying out the prehydration treatment;

(2) On the basis of prehydrated bentonite slurry, 1.5 part by weight of the inhibitor modified organic acid ester LYG-2 is added under the condition of a stirring rate of 600 r/min in a low-speed electric mixer and stirred for 20 min, 7 parts by weight of the filtrate reducer polyanionic cellulose PAC-LV is added and stirred for 15 min, 9 parts by weight of the anti-collapse agent sulfonated asphalt is added and stirred for 15 min, the average particle size of the particles of the water-insoluble part in the sulfonated asphalt is 10 µm, then 3.0 part by weight of the nanometer plugging agent prepared in the Preparation Example 1 is added and stirred for 15 min, 2.2 part by weight of the lubricant graphite is further added and stirred for 15 min, and 40 parts by weight of the weighting agent limestone with an average particle size of 4 µm is added and stirred in a low-speed electric mixer with a stirring rate of 700 r/min for 20 min, thereby prepare the drilling fluid.

The testing results of the linear expansion rate and the rolling recovery rate of the drilling fluid are shown in Table 1, and the testing results of the shale micro-crack plugging performance are shown in Table 2.

Example 4

The example illustrates a nanometer plugging water-based drilling fluid prepared by using the method of the present disclosure.

(1) 100 parts by weight of water is weighted, the water is heated to 70° C., 2 parts by weight of bentonite is added under the condition of a stirring rate 600 r/min of a low-speed electric stirrer, and continuously stirred for 20 min, then 1.5 part by weight of $Na_2CO_3$ is added and further stirred for 30 min, and subjected to standing still for 24 hours at room temperature for carrying out the prehydration treatment;

(2) On the basis of prehydrated bentonite slurry, 1.5 part by weight of the inhibitor modified organic acid ester LYG-2 is added under the condition of a stirring rate of 600 r/min in a low-speed electric mixer and stirred for 20 min, 9 parts by weight of the filtrate reducer polyanionic cellulose PAC-LV is added and stirred for 15 min, 12 parts by weight of the anti-collapse agent sulfonated asphalt is added and stirred for 15 min, the average particle size of the particles of the water-insoluble part in the sulfonated asphalt is 0.2 µm, then 4 part by weight of the nanometer plugging agent prepared in the Preparation Example 1 is added and stirred for 15 min, 3 part by weight of the lubricant graphite is further added and stirred for 15 min, and 50 parts by weight of the weighting agent limestone with an average particle size of 6 µm is added and stirred in a low-speed electric mixer with a stirring rate of 700 r/min for 20 min, thereby prepare the drilling fluid.

The testing results of the linear expansion rate and the rolling recovery rate of the drilling fluid are shown in Table 1, and the testing results of the shale micro-crack plugging performance are shown in Table 2.

Example 5

The example illustrates a nanometer plugging water-based drilling fluid prepared by using the method of the present disclosure.

(1) 100 parts by weight of water is weighted, the water is heated to 70° C., 2 parts by weight of bentonite is added under the condition of a stirring rate 600 r/min of a low-speed electric stirrer, and continuously stirred for 20 min, then 2 part by weight of $Na_2CO_3$ is added and further stirred for 30 min, and subjected to standing still for 24 hours at room temperature for carrying out the prehydration treatment;

(2) On the basis of prehydrated bentonite slurry, 2 part by weight of the inhibitor modified organic acid ester LYG-2 is added under the condition of a stirring rate of 600 r/min in a low-speed electric mixer and stirred for 20 min, 12 parts by weight of the filtrate reducer polyanionic cellulose PAC-LV is added and stirred for 15 min, 16 parts by weight of the anti-collapse agent sulfonated asphalt is added and stirred for 15 min, the average particle size of the particles of the water-insoluble part in the sulfonated asphalt is 2 µm, then 6 part by weight of the nanometer plugging agent prepared in the Preparation Example 1 is added and stirred for 15 min, 4 part by weight of the lubricant graphite is further added and stirred for 15 min, and 60 parts by weight of the weighting agent limestone with an average particle size of 8 µm is added and stirred in a low-speed electric mixer with a stirring rate of 700 r/min for 20 min, thereby prepare the drilling fluid.

The testing results of the linear expansion rate and the rolling recovery rate of the drilling fluid are shown in Table 1, and the testing results of the shale micro-crack plugging performance are shown in Table 2.

Example 6

The drilling fluid is prepared in the same manner as in Example 1, except for that the nanometer plugging agent used in Example 1 is replaced with 0.5 part by weight of the nanometer plugging agent prepared in Preparation Example 2.

The testing results of the linear expansion rate and the rolling recovery rate of the drilling fluid are shown in Table 1, and the testing results of the shale micro-crack plugging performance are shown in Table 2.

Example 7

The drilling fluid is prepared in the same manner as in Example 2, except for that the nanometer plugging agent used in Example 2 is replaced with 1 part by weight of the nanometer plugging agent prepared in Preparation Example 2.

The testing results of the linear expansion rate and the rolling recovery rate of the drilling fluid are shown in Table 1, and the testing results of the shale micro-crack plugging performance are shown in Table 2.

Example 8

The drilling fluid is prepared in the same manner as in Example 3, except for that the nanometer plugging agent used in Example 3 is replaced with 1.6 part by weight of the nanometer plugging agent prepared in Preparation Example 2.

The testing results of the linear expansion rate and the rolling recovery rate of the drilling fluid are shown in Table 1, and the testing results of the shale micro-crack plugging performance are shown in Table 2.

Example 9

The drilling fluid is prepared in the same manner as in Example 4, except for that the nanometer plugging agent used in Example 4 is replaced with 0.4 part by weight of the nanometer plugging agent prepared in Preparation Example 2.

The testing results of the linear expansion rate and the rolling recovery rate of the drilling fluid are shown in Table 1, and the testing results of the shale micro-crack plugging performance are shown in Table 2.

Example 10

The drilling fluid is prepared in the same manner as in Example 5, except for that the nanometer plugging agent used in Example 5 is replaced with 3 part by weight of the nanometer plugging agent prepared in Preparation Example 2.

The testing results of the linear expansion rate and the rolling recovery rate of the drilling fluid are shown in Table 1, and the testing results of the shale micro-crack plugging performance are shown in Table 2.

Example 11

The drilling fluid is prepared in the same manner as in Example 1, except for that the nanometer plugging agent used in Example 1 is replaced with 0.5 part by weight of the nanometer plugging agent prepared in Preparation Example 3.

The testing results of the linear expansion rate and the rolling recovery rate of the drilling fluid are shown in Table 1, and the testing results of the shale micro-crack plugging performance are shown in Table 2.

Example 12

The drilling fluid is prepared in the same manner as in Example 2, except for that the nanometer plugging agent used in Example 2 is replaced with 1 part by weight of the nanometer plugging agent prepared in Preparation Example 3.

The testing results of the linear expansion rate and the rolling recovery rate of the drilling fluid are shown in Table 1, and the testing results of the shale micro-crack plugging performance are shown in Table 2.

Example 13

The drilling fluid is prepared in the same manner as in Example 3, except for that the nanometer plugging agent used in Example 3 is replaced with 1.6 part by weight of the nanometer plugging agent prepared in Preparation Example 3.

The testing results of the linear expansion rate and the rolling recovery rate of the drilling fluid are shown in Table 1, and the testing results of the shale micro-crack plugging performance are shown in Table 2.

Example 14

The drilling fluid is prepared in the same manner as in Example 4, except for that the nanometer plugging agent used in Example 4 is replaced with 0.4 part by weight of the nanometer plugging agent prepared in Preparation Example 3.

The testing results of the linear expansion rate and the rolling recovery rate of the drilling fluid are shown in Table 1, and the testing results of the shale micro-crack plugging performance are shown in Table 2.

Example 15

The drilling fluid is prepared in the same manner as in Example 5, except for that the nanometer plugging agent used in Example 5 is replaced with 3 part by weight of the nanometer plugging agent prepared in Preparation Example 3.

The testing results of the linear expansion rate and the rolling recovery rate of the drilling fluid are shown in Table 1, and the testing results of the shale micro-crack plugging performance are shown in Table 2.

Comparative Example 1

The drilling fluid is prepared in the same manner as in Example 1, except for that the used amount of the nanometer plugging agent is 0 part by weight.

The testing results of the linear expansion rate and the rolling recovery rate of the drilling fluid are shown in Table 1, and the testing results of the shale micro-crack plugging performance are shown in Table 2.

Comparative Example 2

The drilling fluid is prepared in the same manner as in Example 1, except for that the inhibitor organic acid ester LYG-2 and the anti-collapse agent sulfonated asphalt are not added.

The testing results of the linear expansion rate and the rolling recovery rate of the drilling fluid are shown in Table 1, and the testing results of the shale micro-crack plugging performance are shown in Table 2.

Comparative Example 3

The drilling fluid is prepared in the same manner as in Example 1, except for that the nanometer plugging agent and the anti-collapse agent sulfonated asphalt are not added.

The testing results of the linear expansion rate and the rolling recovery rate of the drilling fluid are shown in Table 1, and the testing results of the shale micro-crack plugging performance are shown in Table 2.

Comparative Example 4

The drilling fluid is prepared in the same manner as in Example 1, except for that the dosage of the inhibitor organic acid ester LYG-2 is 1 weight part, the dosage of the anti-collapse agent sulfonated asphalt is 1 weight part, the dosage of the nanometer plugging agent is 7 weight parts, and the dosage of the limestone is 10 weight parts.

The testing results of the linear expansion rate and the rolling recovery rate of the drilling fluid are shown in Table 1, and the testing results of the shale micro-crack plugging performance are shown in Table 2.

Comparative Example 5

The drilling fluid is prepared in the same manner as in Example 6, except for that the dosage of the inhibitor organic acid ester LYG-2 is 1 weight portion, the dosage of the nanometer plugging agent is 0.05 weight portion, the dosage of the sulfonated asphalt is 20 weight portions, and the dosage of the limestone is 70 weight portions.

The testing results of the linear expansion rate and the rolling recovery rate of the drilling fluid are shown in Table 1, and the testing results of the shale micro-crack plugging performance are shown in Table 2.

Comparative Example 6

The drilling fluid is prepared in the same manner as in Example 1, except for that the inhibitor is replaced with 4 parts by weight of KCl.

The testing results of the linear expansion rate and the rolling recovery rate of the drilling fluid are shown in Table 1, and the testing results of the shale micro-crack plugging performance are shown in Table 2.

Comparative Example 7

The drilling fluid is prepared in the same manner as in Example 1, except for that the anti-collapse agent sulfonated asphalt is not added.

The testing results of the linear expansion rate and the rolling recovery rate of the drilling fluid are shown in Table 1, and the testing results of the shale micro-crack plugging performance are shown in Table 2.

Comparative Example 8

The drilling fluid is prepared in the same manner as in Example 1, except for that the average particle size of the used nanometer plugging agent is 95 nm, and the granlarity of limestone is 12 μm.

The testing results of the linear expansion rate and the rolling recovery rate of the drilling fluid are shown in Table 1, and the testing results of the shale micro-crack plugging performance are shown in Table 2.

Comparative Example 9

The drilling fluid is prepared in the same manner as in Example 1, except for that the dosage of the inhibitor organic acid ester LYG-2 is 0.05 weight part, the dosage of the anti-collapse agent sulfonated asphalt is 1.5 weight parts, the dosage of the nanometer plugging agent prepared in the Preparation Example 1 is 7 weight parts, and the dosage of the filtrate reducer polyanionic cellulose PAC-LV is 15 weight parts.

The testing results of the linear expansion rate and the rolling recovery rate of the drilling fluid are shown in Table 1, and the testing results of the shale micro-crack plugging performance are shown in Table 2.

Test Example 1

The linear expansion rate and rolling recovery rate of the nanometer plugging water-based drilling fluids prepared in Examples 1 to 15 and Comparative Examples 1 to 9 are measured for evaluating inhibitive capability of the drilling fluids, the results are shown in Table 1.

(1) Method for Measuring Rolling Recovery Rate

The rock core is ground into 50 g of particles with 6-10 meshes, 350 ml of drilling fluid is taken, the drilling fluid is taken into an aging kettle, the rock core particles are added and the mixture is stirred. The mixture is subjected to aging in a high-temperature high-pressure roller furnace at a temperature of 150° C. for 16 h, and then is cooled after 16 h. The aged slurry is washed in a 40 mesh sieve and the remaining particles are dried in a drying oven (110° C., 6 h). The dried rock debris is weighed. The higher is the rolling recovery rate, it indicates that the drilling fluid has stronger capability of inhibiting hydration expansion of clay minerals.

Rolling recovery rate (%)=weight of aged and dried rock debris (g)/50 g×100%

(2) Method for Measuring Linear Expansion Rate

The rock core is initially ground to particles with 100 meshes, 8 g of the rock core is used for each experiment. 200 ml of filtrate of the drilling fluid is pressed by a medium-density filtration loss instrument. The inner cylinder of the NP-O1 type linear dilatometer is taken out, and the depth L1 of the inner cylinder is measured. A filter screen is placed and a filter paper is added. Then 8 g of 100 meshes rock debris is weighted and added into the inner cylinder, the rock debris is pressed under a press machine (the pressure of the press machine is 10 Mpa, the pressing time is 5 min), and the depth L2 of the inner cylinder is measured after the rock debris is added. The inner cylinder is then arranged in the outer cylinder of the linear expansion instrument, and a dial indicator is installed. A filtrate is added from a small hole in the lid until the pressed core was submerged by the filtrate. The swelling amount is measured according to the required time.

Linear expansion rate (%)=$L1/L2$×100%

The lower is the linear expansion rate, it indicates the stronger are the capability of the drilling fluid in inhibiting hydration expansion of the clay and the plugging capability of the drilling fluid. The drilling fluid forms compact, tough and extremely thin mud cakes with permeability approaching to zero under the circulating percolation action of a shaft, so that the filtrate of the drilling fluid is prevented from entering into a borehole wall and apertures to generate stress release cracks, the collapse and block falling of the borehole wall resulting in sticking of drilling tool is avoided, thus the drilling fluid may efficiently plug and prevent collapse.

TABLE 1

| Numbers | Density g/cm³ | Rolling recovery rate % | Linear expansion rate at 4 h % | Linear expansion rate at 12 h % |
| --- | --- | --- | --- | --- |
| Clear water | 1.00 | 83.2 | 16.38 | 32.85 |
| Clear water | 1.00 | 83.3 | 16.35 | 33.20 |
| Example 1 | 1.25 | 95.3 | 9.55 | 15.56 |
| Example 2 | 1.32 | 95.2 | 9.56 | 15.57 |
| Example 3 | 1.40 | 95.4 | 9.58 | 15.53 |
| Example 4 | 1.45 | 94.2 | 9.72 | 15.64 |
| Example 5 | 1.50 | 94.5 | 9.69 | 15.63 |
| Example 6 | 1.24 | 93.4 | 9.75 | 16.68 |
| Example 7 | 1.31 | 93.5 | 9.76 | 16.62 |
| Example 8 | 1.38 | 93.3 | 9.67 | 16.64 |
| Example 9 | 1.46 | 93.4 | 9.62 | 16.67 |
| Example 10 | 1.49 | 92.4 | 9.87 | 16.54 |
| Example 11 | 1.25 | 91.7 | 9.79 | 16.35 |
| Example 12 | 1.32 | 92.6 | 9.84 | 16.37 |
| Example 13 | 1.41 | 92.4 | 9.83 | 16.36 |
| Example 14 | 1.45 | 92.7 | 9.85 | 16.56 |
| Example 15 | 1.48 | 92.6 | 9.86 | 16.64 |
| Comparative | 1.19 | 88.4 | 13.88 | 28.65 |
| Comparative | 1.18 | 85.5 | 17.25 | 29.25 |
| Comparative | 1.20 | 84.3 | 16.88 | 27.23 |
| Comparative | 1.18 | 88.3 | 15.12 | 26.35 |
| Comparative | 1.19 | 89.5 | 14.23 | 25.89 |
| Comparative | 1.20 | 91.2 | 12.24 | 26.98 |
| Comparative | 1.21 | 89.2 | 17.56 | 26.36 |
| Comparative | 1.21 | 89.4 | 15.78 | 27.75 |
| Comparative | 1.22 | 88.7 | 14.23 | 29.42 |

The data in Table 1 illustrates that the rolling recovery rate of the drilling fluids in the Examples 1-15 is within a range of 92.4-95.4%, it is obviously improved compared with that of clear water. In addition, the linear expansion rates at 4 h of Examples 1-15 are within a range of 9.55-9.87%, and the linear expansion rates at 16 h of Examples 1-15 are within a range of 15.53-16.68%; the rolling recovery rates of the Comparative Examples 1-9 are within a range of 84.3-91.2%, which are slightly improved compared with those of clear water. In addition, the linear expansion rates at 4 h of the Comparative Examples 1-9 are within a range of 12.24-17.56%, the linear expansion rates at 16 h of the Comparative Examples 1-9 are within a range of 25.89-29.42%. The nanometer plugging water-based drilling fluid disclosed by the present disclosure is suitable for deep well large displacement horizontal section shale stratum micro-nanometer cracks, can perform effective plugging, effectively inhibit hydration expansion of shale clay, realize borehole wall stability and maintain stratum stability, thus it is beneficial to safe drilling.

Test Example 2

The test results of the plugging performance of the nanometer plugging water-based drilling fluids prepared in Examples 1-15 and Comparative Examples 1-9 are shown in Table 2.

Taking a proper amount of the drilling fluids prepared in the Examples 1-10 and the Comparative Examples 1-9 respectively for later use, using a visual sand bed filtration loss meter, taking 250 cm³ of 80-mesh quartz sand and mixing it with 120 cm³ of 200-mesh quartz sand and stirring the mixture uniformly, slowly adding the mixture into a transparent cylindrical drilling fluid cup, simulating a carbonate rock heterogeneous pore and crack type fragile stratum, then slowly adding 500 cm³ of the prepared spare drilling fluid respectively, closing a cup cover, switching on a nitrogen gas source and adjusting the air pressure to 0.69 MPa, opening a vent valve after confirming an error free circumstance, transferring the pressure into the drilling fluid cup, simulating the percolation action of the drilling fluid under the action of high pressure of the stratum in the circulation process of a shaft, simultaneously observing the percolation process of the drilling fluid in the transparent cup and recording the invasion depth of the drilling fluid at the time lapses of 7.5 min and 30 min respectively. The experimental test results are shown in Table 2.

The smaller invasion depth indicates that the higher-efficiency plugging anti-collapse drilling fluid is prepared from a rigid material and an elastic material according to reasonable particle size grading, and the aim of fully realizing multi-element synergistic plugging under the high-temperature action in the well is fulfilled, so that the water leakage of the drilling fluid is reduced, and the hydration expansion of a shale stratum and the collapse of a borehole wall are avoided.

TABLE 2

| Numbers | The invasion depth/cm at the time of 7.5 min | The invasion depth/cm at the time of 30 min |
| --- | --- | --- |
| Example1 | 1.9 | 3.5 |
| Example2 | 2.0 | 3.7 |
| Example3 | 2.0 | 3.5 |
| Example4 | 2.4 | 4.2 |
| Example5 | 2.5 | 4.2 |
| Example6 | 2.3 | 3.9 |
| Example7 | 2.4 | 3.8 |
| Example8 | 3.2 | 4.6 |
| Example9 | 3.1 | 4.7 |
| Example10 | 3.6 | 5.2 |
| Example11 | 3.7 | 5.5 |
| Example12 | 3.5 | 5.2 |
| Example13 | 3.8 | 5.1 |
| Example14 | 3.7 | 5.2 |
| Example15 | 3.8 | 5.3 |
| Comparative Example 1 | 6.5 | 7.6 |
| Comparative Example 2 | 5.8 | 6.8 |
| Comparative Example 3 | 8.5 | 10.2 |
| Comparative Example 4 | 5.8 | 7.9 |
| Comparative Example 5 | 6.3 | 8.5 |
| Comparative Example 6 | 4.8 | 6.8 |
| Comparative Example 7 | 5.6 | 8.9 |
| Comparative Example 8 | 4.5 | 6.3 |
| Comparative Example 9 | 5.7 | 7.3 |

As shown in Table 2, compared with the performances of the drilling fluids of Examples 1-15, the drilling fluids of Examples 1-15 have the invasion depths less than 3.8 cm at the time of 7.5 min and less than 5.5 cm at the time of 30 min; the drilling fluids of Comparative Examples 1-9 have the invasion depths higher than 4.5 cm at the time of 7.5 min and higher than 6.3 cm at the time of 30 min; it demonstrates that the nanometer plugging water-based drilling fluid may perform effective anti-collapse of stratum and maintain the stability of stratum.

To sum up, the micro-nanometer strong plugging anti-collapse drilling fluid disclosed by the present disclosure fully performs multi-element cooperative plugging under the high-temperature action in a well through reasonable particle size grading of the rigid material and the elastic material, in combination with the optimum added amounts, such that the particle size of the drilling fluid is fully and uniformly distributed at the micro-nanometer level, the drilling fluid filtrate is prevented from entering a borehole wall and apertures to generate stress release cracks, the borehole wall is effectively prevented from collapsing and falling blocks to cause sticking of the drilling tool in the drilling process, thereby performing the plugging and anti-collapse efficiently.

The above content describes in detail the preferred embodiments of the invention, but the invention is not limited thereto. A variety of simple modifications can be made to the technical solutions of the invention within the scope of the technical concept of the invention, including a combination of individual technical features in any other suitable manner, such simple modifications and combinations thereof shall also be regarded as the content disclosed by the present invention, each of them falls into the protection scope of the present invention.

The invention claimed is:

1. A nanometer plugging water-based drilling fluid comprising water, bentonite, an anti-collapse agent, a nanometer plugging agent, a weighting agent, a shale inhibitor, a filtrate reducer, and a lubricant; wherein
    the anti-collapse agent is sulfonated asphalt;
    the nanometer plugging agent is surface modified $SiO_2$ powder comprising surfactant, and has an average particle size of 10-80 nm, wherein the surfactant is sodium dodecyl sulfate and the surface modified $SiO_2$ powder further comprises $SiO_2$ surface modified with linear alkylbenzene sulfonate (LAS);
    the weighting agent is limestone with an average particle size of 2-10 μm;
    the shale inhibitor is an organic acid ester;
    the filtrate reducer is a polyanionic cellulose;
    the lubricant is graphite;
    based on 100 parts by weight of water, the bentonite is 1-5 parts by weight, the anti-collapse agent is 2-16 parts by weight, the nanometer plugging agent is 0.1-6 parts by weight, the weighting agent is 20-60 parts by weight, the shale inhibitor is 0.5-2 parts by weight, the filtrate reducer is 2-12 parts by weight and the lubricant is 0.2-4 parts by weight.

2. The drilling fluid of claim 1, wherein based on 100 parts by weight of water, the bentonite is 2-4 parts by weight, the anti-collapse agent is 4-12 parts by weight, the nanometer plugging agent is 0.3-4 parts by weight and the weighting agent is 25-45 parts by weight.

* * * * *